F. C. CHAPMAN.
DEHYDRATOR.
APPLICATION FILED MAY 1, 1920.
1,404,369.
Patented Jan. 24, 1922.
3 SHEETS—SHEET 1.
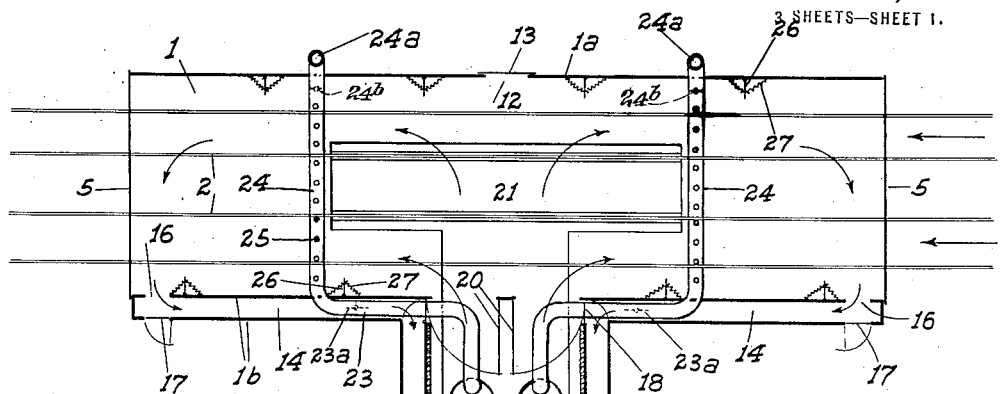
Fig. 1
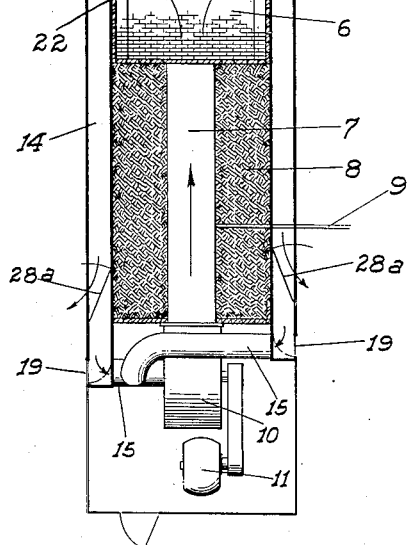
Fig. 4
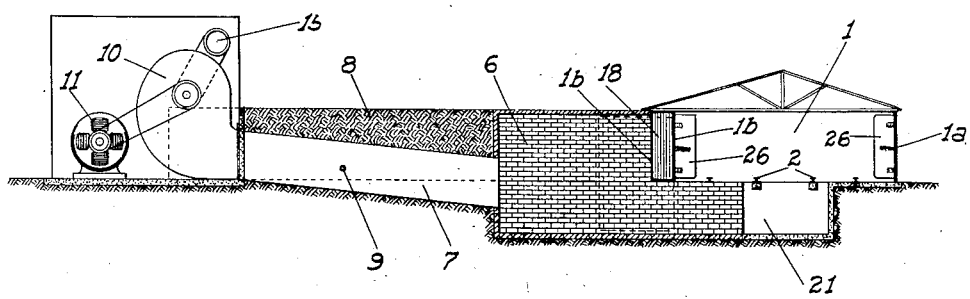
INVENTOR.
Frank C. Chapman
BY
ATTORNEY.

F. C. CHAPMAN.
DEHYDRATOR.
APPLICATION FILED MAY 1, 1920.

1,404,369.

Patented Jan. 24, 1922.
3 SHEETS—SHEET 2.

INVENTOR.
Frank C. Chapman
BY
ATTORNEY

INVENTOR.
Frank C. Chapman
BY
ATTORNEY

UNITED STATES PATENT OFFICE.

FRANK C. CHAPMAN, OF MODESTO, CALIFORNIA.

DEHYDRATOR.

1,404,369.  Specification of Letters Patent.  Patented Jan. 24, 1922.

Application filed May 1, 1920. Serial No. 378,158.

*To all whom it may concern:*

Be it known that I, FRANK C. CHAPMAN, a citizen of the United States, residing at Modesto, in the county of Stanislaus, State of California, have invented certain new and useful Improvements in Dehydrators; and I do declare the following to be a full, clear, and exact description of the same, reference being had to the accompanying drawings, and to the characters of reference marked thereon, which form a part of this application.

This invention relates to improvements in devices for drying fruit and other products, the principal object of the invention being to provide a device by means of which a large quantity of fruit and the like, suitably carried on trays mounted on movable trucks, may be quickly and thoroughly dried in a continuous manner and process without shutting down the dryer for days or weeks at a time, so that as the first batch of produce is dried, it is removed, while another one is moved in to fill up the vacant space, and so on indefinitely.

This dryer is built to normally receive the produce therein at one end and to discharge it at the other, while the heat is applied mainly at the center, though it may also be passed in at the ends in certain cases. With this type of dryer it is impossible to burn the fruit, since when the fruit reaches the hottest air, it is only half dried, and from there to the discharge end of the dryer, the heat is lessening in intensity, and contains more humidity. The dryer can also be opened at either end to receive or discharge fruit without the loss of any dry air, since by that time the air has absorbed sufficient moisture to become damp, and is ready to be discharged into the open air.

By making the drying process continuous, there is no loss of heat, as the fires are kept up and are continuous. With dryers that are started and stopped to reload, the heat is lost after opening the dryer up to empty it. Again loss is occasioned by reheating it to make a fresh start, this requiring several hours to attain the required temperature.

Another object of my invention is to so arrange the drying-air passages of the dehydrator that currents of hot dry air may be introduced therein either at the center or at the ends, or both; so that the articles being dried will be evenly subjected to the action of the dry air throughout the length of the drying shed, and will not be over dried at one point and incompletely dried at another.

This feature is especially valuable in the case of a relatively small consignment of produce to be dried, or in the case of some truck load that may require a longer time to dry, due sometimes to improper dipping, or checking of the skins, as in the case of prunes or lye dipped grapes, caused by the dipping water becoming too cool, or the lye too weak.

Also with fruit such as grapes, lying on trays, a large bunch may protect smaller bunches from the direct action of the air as the truck travels towards the heat and prevent such bunches drying as much as the others; but after the truck passes the center, the action of the air is reversed, and all the trucks are subjected to the reversed action of the air, thereby giving all the fruit a desired exposure to the hot air. Produce enters at one end and is discharged at the other, thereby allowing each truck to pass through the same atmospheric conditions, causing each truck to be delivered at the discharge end in the same condition of dryness as the preceding truck.

Since the hot air normally enters the dryer at the middle, produce entering at one end and being gradually moved toward the heat starts drying at a relatively low temperature, and in a more moist air. This prevents searing over the outside, by gradually heating the fruit and starting evaporation. By the time the fruit has reached the center of the dryer, it is half dried; except to bottom trays on the trucks, which are standing directly over the rising hot air from the furnace, causing the bottom trays to dry while moving toward the discharge end of the drier. This will not be accomplished in ordinary dryers of this type, on acount of the damp air settling to the bottom.

By discharging the fruit a proper distance from the hottest point, which is at the center, it is thus cool enough to be able to tell the amount of moisture it still contains. If discharged at the hot end, as in dryers so constructed, the fruit, if containing a large amount of sugar, is soft; and while it appears wet, is too dry when cooled, and if not watched continually while drying, the fruit at the hot end will easily burn, thus ruining it, as is often the case.

A further object of my invention is to provide a means for utilizing the exhausted air, should this be desirable, or for permitting such air to escape and taking in fresh air from the outside, should atmospheric conditions be such that the outside air is warmer and of relatively less humidity than the used air in the dryer, or vice versa.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a diagrammatic plan of my dehydrator, showing the gates, etc., therein arranged to cause the air to enter the dehydrator at the middle, and to be returned to the blower.

Fig. 4 is a cross section through the dehydrator, heater, and blower.

Figure 2:
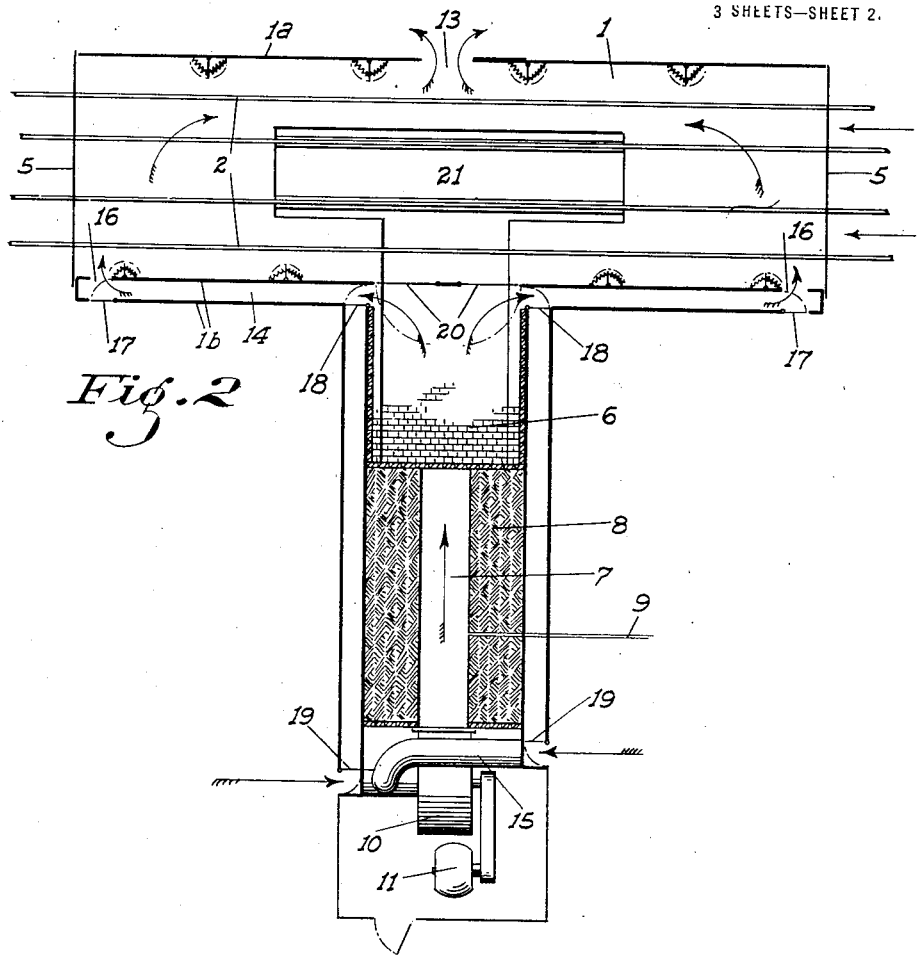
Fig. 2 is a similar view, showing the air passed into the dehydrator at the ends, and exhausted into the atmosphere at the center, a fresh supply of air being taken in at the blower.
Figure 6:
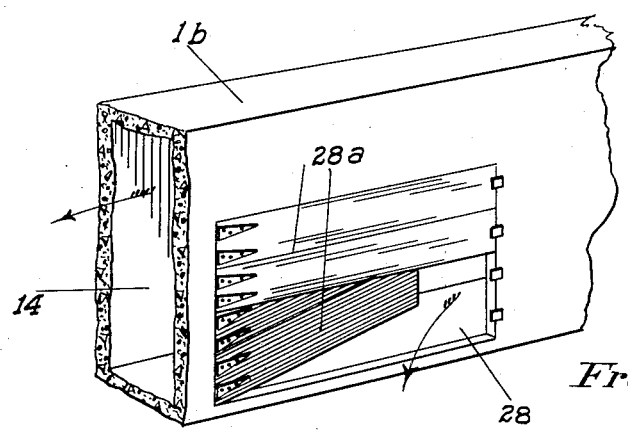
Fig. 6 is a fragmentary perspective showing the means for allowing the lower layers of heavy and cold air to escape.

Referring now more particularly to the characters of reference on the drawings, the numeral 1 denotes the dehydrator proper, consisting of a shed or tunnel, substantially air tight when in operation except as hereinafter noted, and through which run tracks 2 adapted to receive wheeled trucks 3 thereon which are laden with spaced trays 4 on which is the fruit, etc., to be dried.

The tracks extend lengthwise through the shed, the ends of which when the fruit is inside being closed by swing or drop doors 5 of any suitable type.

Centrally of the length of the shed and communicating therewith is an enclosed air-oven 6, projecting to one side of the shed. Beyond this oven is a large flue 7 surrounded by a dirt fill 8, and having an oil burner 9 or suitable heating means projecting therein.

Beyond this flue is a blower 10 run by a motor 11 or other power means, and discharging into said flue.

The side-wall 1ª of the shed opposite the oven is of suitable thickness, and is provided with a central outlet 12 adapted to be closed at will by a door 13.

The walls 1ᵇ of the shed on the side having the oven are double and form air passages 14, these passages extending to the blower and adapted to communicate with the intakes 15 thereof, and pass alongside the oven, so that the heat radiating therefrom will aid in heating the air again.

The inner of the double walls is provided with openings 16 into the shed at the ends thereof, and the outer has doors 17 in alinement therewith, which may be opened or closed at will.

Doors 18 also are positioned in the double walls adjacent the oven 6, and are adapted to either allow communication from the openings 16 to the oven or to permit the air to travel directly through the wall flues, communication with the air-oven being then shut off.

Doors 19 are also placed in the outer of said double walls adjacent the blower, being arranged to either allow free passage of the air from the wall flues to the burner, or to be moved to shut off such passage of air through the flues and open up communication from the outside air to the blower.

Doors 20 are positioned in the air-oven 6 where it communicates with the shed, and arranged to be closed to shut off such communication. All these doors and openings, and the flues 14, extend for the full height of the shed.

In order to throw the hot air down as much as possible, the flue 7 slopes downwardly, and discharges into a depression 21 which passes under the tracks in the shed and extends lengthwise of the same for a certain distance.

Also if desired I may have funnel-shaped members 22 projecting up into the oven 6, and adapted to receive some of the air thereinto and convey it through flues 23 in both directions lengthwise of the shed, from which flues it emerges from transversely positioned flues 24 laid under the tracks 2, these latter flues having a plurality of vertical escapement-holes 25 therein, and leading to stacks or discharge flues 24ª outside the shed.

Dampers 23ª are interposed in the flues 23, and similar dampers 24ᵇ in the flues 24ª. By closing the dampers 23ª and opening the dampers 24ᵇ, some of the lower layers of cold and humidity laden air will be drawn to the outer air through the holes 25, by reason of the air pressure in the shed being greater than that of the atmosphere, aided by the natural draft through the flues. By opening the dampers 23ª, and closing the dampers 24ᵇ, a certain amount of hot air is taken directly from the oven and discharged into the shed through the holes 25 at points intermediate the central well and the ends of the shed. Thus the flue construction 23—24 may serve a double purpose.

Figure 5:
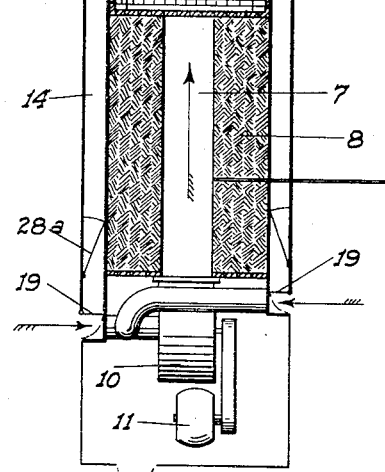
Fig. 5 is an enlarged cross section through the dehydrator, showing the fruit-loaded trucks therein.
Figure 5:
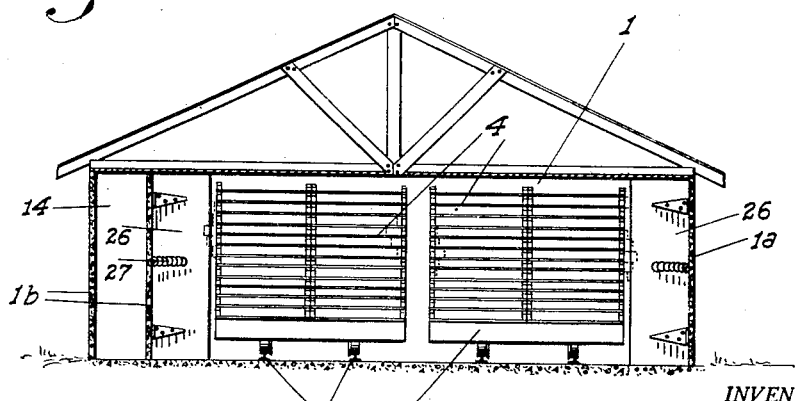

In order to retard the passage of the air through the shed, I provide baffle plates 26 hinged vertically to the walls thereof and projecting transversely thereinto. In order to permit them to extend into the shed far enough to be effective, and yet make them so as not to be damaged by badly placed or off-set trays, as shown in Fig. 5, they are held in transverse position only by springs 27, so that they are flexibly maintained and may be pushed against and struck by the fruit trays without danger of breakage or dislodgment of the baffles or trays.

The return flue formed by the double walls is to be made much higher than its width, so as to give the strata of air a chance to separate, the damp air naturally settling to the bottom.

In the outer wall of each of the flues, preferably near the blower, I therefore provide a vertical opening 28, closed by a plurality of horizontally hinged doors 28ª, any of these doors being adapted to project into the flues 14 and rest against the inner surface at an angle thereto, in the direction of the air-flow, so that any strata of damp air which it is not desired to further utilize may be shunted to the outside, while permitting the air above to continue on its way.

In operation, for a continuous procedure lasting possibly for weeks, a single fruit-laden truck on each track is first admitted to the dryer at one end. After remaining at that end for a certain length of time, another truck load is admitted, forcing the preceding one ahead, this being continued indefinitely, each truck load as it reaches the farther end of the dryer being then thoroughly dried and ready to be removed, the remaining trucks being then of course moved up accordingly.

Figure 3:
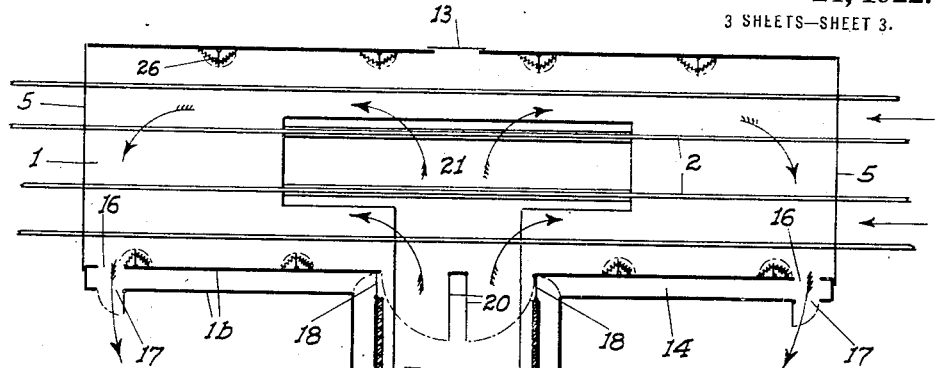
Fig. 3 is a similar view showing the air passed into the center of the dehydrator, and exhausted into the outside air at the ends.

During the time the fruit is in the dryer during the continuous procedure, the heated air from the blower and oven is passed through the shed from the center toward the ends, as shown in Figs. 1 and 3. This ensures that the air will travel in both directions, thus passing through the trays from both ends as they approach and pass the center. Since the fresh hot air is at the center of the shed, the raising of the doors at either end to admit or discharge truck loads will not cause the loss of any of such fresh air, and the oven and blower need never to be shut down on that account.

In the event of a special load of produce to be dried, when there is just enough to fill the shed once, and not so as to permit a continuous operation, the heated air from the blower and oven is passed through the shed from the center toward the ends for a part of the time, and from the ends toward the center for the remainder of the time, as shown in Fig. 2; thus insuring that the truck loads of fruit, both at the ends and center of the shed and throughout the length of the same as well, will all be equally dried at the same time, so that the whole consignment may be withdrawn from the dryer at the same time.

In the latter mentioned direction of flow of the air, it will of necessity pass into the outer air after traversing the shed, and fresh air must be taken in at the blower. In the first described direction of flow of the air however, it may be either returned to the blower to be again utilized at a minimum of expense for heating the same, or it may be discharged into the outer air should conditions render this desirable, as shown in Figs. 1 and 2 respectively.

This is so arranged on account of the fact that the humidity present in the air after passing over the fruit, especially during the first stages, is often so great that the outer fresh air is dryer than the used air, and it may therefore be preferable to use such fresh air.

The lower layers of the air returning to the blower through the double-wall flues are naturally the coldest and most humidity-laden, and for this reason the angled shunt-doors 28ª are provided to allow such lower layers of air to be diverted to the atmosphere, while permitting the still dry and warm air to continue to the blower.

In the event that a truck load of fruit arrives at the discharge end of the shed in an imperfectly dry condition, due to the extra large size of the fruit or for other reasons, the central door 20 nearest that end may be closed, the corresponding flue-door 18 opened to the oven, and the door 17 at the end closed to the atmosphere. Some of the hot air will then pass in at the end of the shed, thus acting directly on the under-dry fruit, rapidly completing the drying of the same. All the air will then move toward the front end of the dryer, to be returned to the blower from that end or discharged to the atmosphere.

Also the air after passing over the end-trucks and moving forward, is humidity laden, thus preventing the remaining fruit from any tendency toward burning.

From the foregoing description it will be readily seen that I have produced such a device as substantially fulfills the objects of the invention as set forth herein.

While this specification sets forth the present and preferred construction of the device, still in practice such deviations from such detail may be made as do not form a departure from the spirit of the invention, as defined by the appended claims.

Having thus described my invention what I claim as new and useful and desire to secure by Letters Patent is:—

1. A dehydrator comprising an enclosed shed adapted to receive the produce to be dried therein, means for providing a supply of air under pressure, a heating oven opening into the shed centrally of its length and through which the air under pressure passes, and means whereby the air may be diverted from passing into the shed directly from the oven and passed thereinto at the ends.

2. A dehydrator comprising an enclosed shed adapted to receive the produce to be dried therein, means for providing a supply of air under pressure, a heating oven opening into the shed centrally of its length and through which the air under pressure passes, and means for returning the air to the pressure producing means after passing through the shed or permitting it to be discharged into the atmosphere.

3. A dehydrator comprising an enclosed shed adapted to receive the produce to be dried, a blower arranged to force a current of air through the shed, and having its intake connected with such air after it has passed through the shed, and means whereby the cold and heavy air will be passed to the atmosphere prior to reaching the blower while permitting the light air to proceed thereto.

4. A dehydrator comprising an enclosed shed adapted to receive the produce to be dried, a blower arranged to force a current of air through the shed, a discharge flue leading from the shed to the intake of the blower, and diverting doors in the flue arranged to be positioned to pass the lower layers of the air passing therethrough into the atmosphere.

5. A dehydrator comprising an enclosed shed adapted to receive the produce to be dried therein, means for providing a supply of air under pressure, a heating oven opening into the shed centrally of its length and through which the air under pressure passes, flues leading from the ends of the shed to the pressure supply means and communicating therewith, doors in the oven whereby the same may be shut off from direct communication with the shed, and doors in the flues adapted to be positioned to provide communication through the flues from the oven to the shed while closing the passage to the supply means.

6. A dehydrator comprising an enclosed shed adapted to receive the produce to be dried therein, means for providing a supply of air under pressure, a heating oven opening into the shed and through which air under pressure passes, flues leading from the ends of the shed to the pressure supply means, and communicating therewith doors means, and communicating therewith doors in the flues leading to the atmosphere adjacent the openings of the flues into the shed whereby the air from the shed will discharge into the atmosphere, and means whereby the air-pressure supply means may then take its supply from the atmosphere.

7. A dehydrator comprising an enclosed shed adapted to receive the produce to be dried therein, means for providing a supply of air under pressure, a heating oven opening into the shed centrally of its length and through which the air under pressure passes, and flues leading from the air discharges of the shed to the pressure supply means and communicating with the intake thereof, the flues passing adjacent the oven, whereby the heat radiating therefrom will aid in reheating the air returning to the pressure supply means.

8. A dehydrator comprising an enclosed shed adapted to receive the produce to be dried, a blower arranged to force a current of heated air through the shed, a return flue leading to the blower from the shed, said flue being relatively narrow compared to its height, whereby the strata of air of different humidities can separate, and a means for withdrawing the lower strata of air from the flue before reaching the blower.

9. A dehydrator comprising an enclosed shed, a heating oven therefor, flues laid on the bottom of the shed and having their intakes in the oven, and means whereby heated air from the oven may be taken into the shed through said flues or some of the air already in the shed may be automatically discharged into the atmosphere through said flue.

10. A dehydrator comprising an enclosed shed, a heating oven therefor, flues laid on the bottom of the shed and having their intakes in the oven, and their outlets open to the atmosphere, and being provided with orifices on their upper sides inside the shed, and dampers at both ends of the orificed portions of the flues.

11. A dehydrator comprising an enclosed shed, tracks running lengthwise through said shed and on which the produce to be dried is supported and moved from one end of the shed to the other, means for providing a supply of heated air under pressure, and a pit positioned substantially centrally of the length of the shed and extending under the tracks, the hot air entering the shed through an intake in a wall of said pit.

In testimony whereof I affix my signature.

FRANK C. CHAPMAN.